United States Patent
Zhang et al.

(10) Patent No.: US 9,407,151 B2
(45) Date of Patent: Aug. 2, 2016

(54) FLYBACK CONVERTER WITH CURRENT CONTROLLED LOW POWER MODE

(71) Applicant: Chengdu Monolithic Power Systems Co., Ltd., Chengdu (CN)

(72) Inventors: Junming Zhang, Hangzhou (CN); Yuancheng Ren, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 116 days.

(21) Appl. No.: 14/508,929

(22) Filed: Oct. 7, 2014

(65) Prior Publication Data

US 2015/0103569 A1 Apr. 16, 2015

(30) Foreign Application Priority Data

Oct. 10, 2013 (CN) .......................... 2013 1 0471361

(51) Int. Cl.
*H02M 3/335* (2006.01)
*H02M 1/00* (2006.01)

(52) U.S. Cl.
CPC .. *H02M 3/33507* (2013.01); *H02M 2001/0032* (2013.01); *Y02B 70/16* (2013.01)

(58) Field of Classification Search
CPC ................. H02M 2001/0032; H02M 3/33507; H02M 3/33523; H02M 3/33592; H02M 3/33553; H02M 3/3353; Y02B 70/1433; Y02B 70/16

USPC ..................... 363/21.06, 21.14, 127
See application file for complete search history.

(56) References Cited

U.S. PATENT DOCUMENTS

| | | | |
|---|---|---|---|
| 2010/0110732 A1 | 5/2010 | Moyer et al. | |
| 2012/0300520 A1 | 11/2012 | Ren et al. | |
| 2014/0240619 A1* | 8/2014 | Yokohama | G06F 3/044 349/12 |
| 2015/0048755 A1* | 2/2015 | Imanaka | H02M 3/33507 315/291 |
| 2015/0229223 A1* | 8/2015 | Cao | H02M 3/33515 363/21.13 |

* cited by examiner

*Primary Examiner* — Harry Behm
*Assistant Examiner* — Peter Novak
(74) *Attorney, Agent, or Firm* — Perkins Coie LLP (57) ABSTRACT

An isolated switching converter includes a transformer having a primary winding, a secondary winding and an auxiliary winding, a primary switch coupled to the primary winding, a secondary switch coupled to the secondary winding, and a feedback circuit coupled to the auxiliary winding to generate a feedback signal indicative of the output voltage. Under normal operation, the primary switch is controlled based on the feedback signal and the secondary switch is controlled based on the status of the primary switch. Under light load condition, the secondary switch is controlled based on the output voltage. The secondary switch is turned on to generate a negative secondary current flowing through the secondary winding and turned off when the negative secondary current reaches a secondary current threshold. The primary switch is turned on based on a negative primary current and turned off when the primary current reaches a primary current threshold.

15 Claims, 10 Drawing Sheets

FLYBACK CONVERTER WITH CURRENT CONTROLLED LOW POWER MODE

CROSS-REFERENCE TO RELATED APPLICATION(S)

This application claims the benefit of CN application 201310471361.X filed on Oct. 10, 2013, and incorporated herein by reference.

TECHNICAL FIELD

The present invention generally relates to electronic circuits, and more particularly but not exclusively to isolated switching converters and control methods thereof.

BACKGROUND

Isolated switching converters are widely used in off-line power supplies and applications with high security requirement. Precise control strategies with high efficiency, low EMI and low cost are required in these applications. And more, to achieve accurate regulation of the power provided to the load, feedback is necessary.

Figure 1:
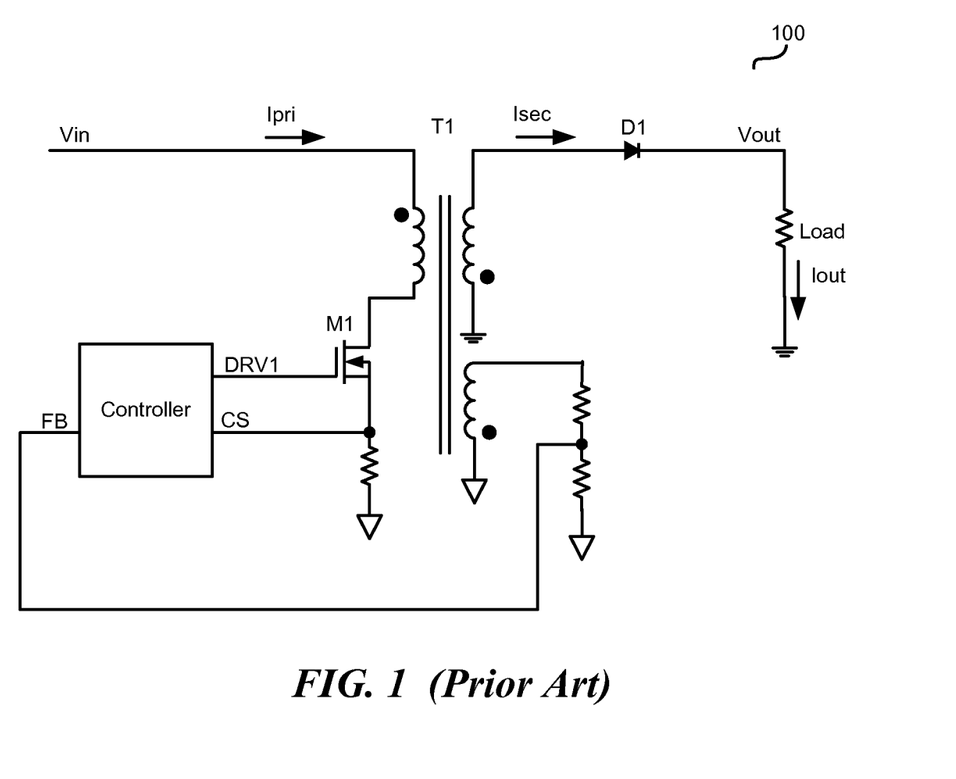
FIG. 1 illustrates a traditional isolated switching converter 100 which utilizes an auxiliary winding for feedback.

FIG. 1 illustrates a traditional isolated switching converter 100 which utilizes an auxiliary winding for feedback. When the rectifier D1 is on, the voltage across the auxiliary winding of the transformer T1 is proportional to the output voltage Vout of the switching converter. So, feedback information can be gained through detecting the voltage across the auxiliary winding. As shown in FIG. 1, the voltage across the auxiliary winding is detected to provide a feedback signal FB. The controller generates a control signal DRV1 to control the main switch M1 based on the feedback signal FB and a current sensing signal CS indicative of the primary current Ipri.

The feedback method shown in FIG. 1 is simple and easy, however, it still has some drawbacks. First, the feedback signal FB can indicate the output voltage Vout only when the rectifier D1 is on. As a result, even under no load condition (the output current Iout is almost zero), the main switch M1 still needs to be turned on, so the rectifier D1 can be turned on to provide the feedback information. The no load efficiency of the switching converter 100 is limited.

Figure 2:
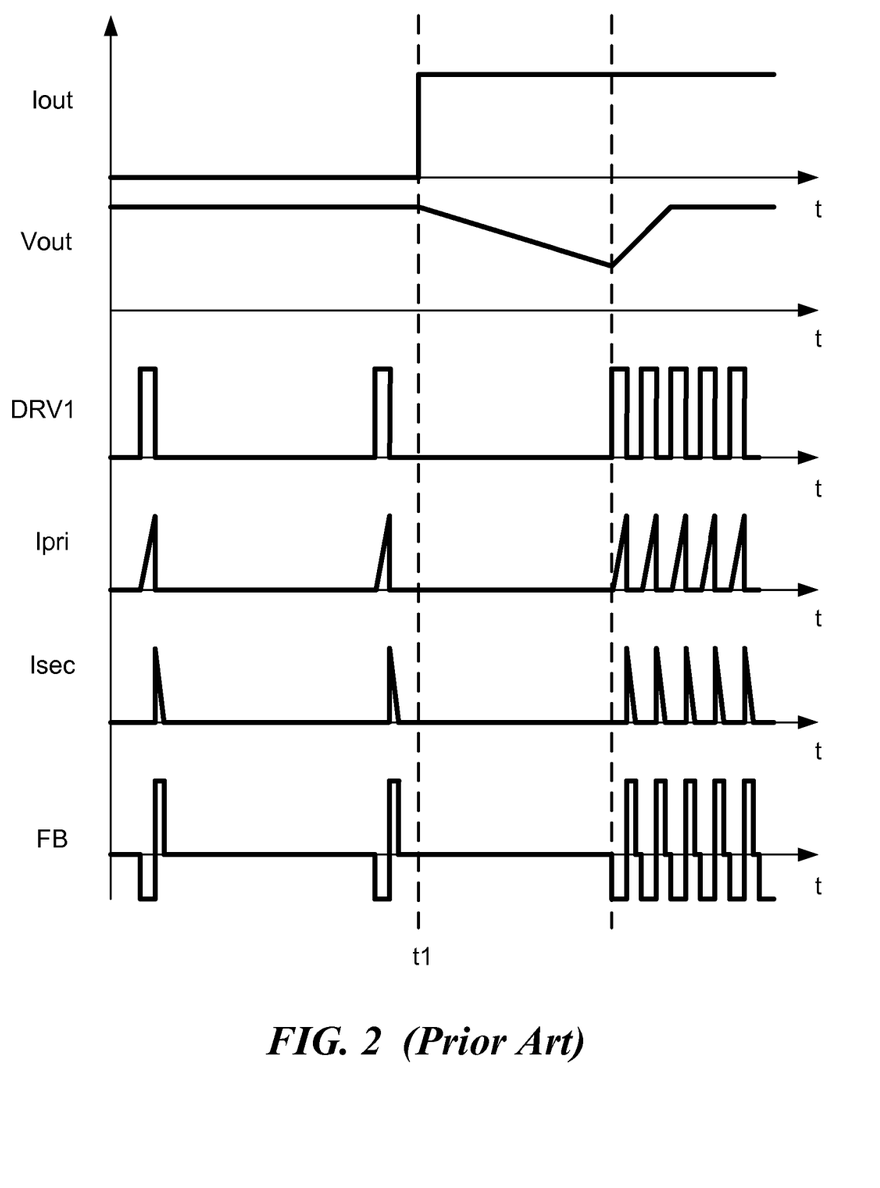
FIG. 2 illustrates waveforms of the isolated switching converter 100 shown in FIG. 1 under light load condition.

Secondly, under light load condition (the output current Iout is smaller than a predetermined threshold), the switching converter 100 often works in DCM (discontinuous current mode) and the switching frequency is low. FIG. 2 illustrates waveforms of the isolated switching converter 100 under light load condition. As shown in FIG. 2, after the energy stored in the transformer T1 has all been transferred to the load, which means the secondary current Isec has been reduced to zero, the feedback signal FB is maintained zero and cannot indicate the load information. If the output current Iout is suddenly increased (e.g. at t1), the switching converter 100 cannot give a timely response and there will be a large undershoot at the output voltage Vout.

SUMMARY

Embodiments of the present invention are directed to an isolated switching converter, comprising: a transformer having a primary winding, a secondary winding and an auxiliary winding, wherein the primary winding is configured to receive an input voltage, the secondary winding is coupled to provide an output voltage to a load; a primary switch coupled to the primary winding; a secondary switch coupled to the secondary winding; a feedback circuit coupled to the auxiliary winding, wherein the feedback circuit is configured to generate a feedback signal indicative of the output voltage; a primary controller configured to generate a primary control signal to control the primary switch; and a secondary controller configured to generate a secondary control signal to control the secondary switch; wherein under normal operation, the primary controller controls the primary switch based on the feedback signal, the secondary controller turns on the secondary switch after the primary switch is off and turns off the secondary switch before the primary switch is on; and wherein under light load condition, the secondary controller controls the secondary switch based on the output voltage, the secondary controller turns on the secondary switch after the primary switch is off to generate a negative secondary current flowing through the secondary winding, and turns off the secondary switch when the negative secondary current reaches a secondary current threshold to generate a negative primary current flowing through the primary winding, the primary controller turns on the primary switch based on the negative primary current and turns off the primary switch when the primary current reaches a primary current threshold.

Embodiments of the present invention are also directed to a control method used in an isolated switching converter. The isolated switching converter is configured to convert an input voltage into an output voltage to drive a load. It comprises a transformer having a primary winding, a secondary winding and an auxiliary winding, a primary switch coupled to the primary winding, a secondary switch coupled to the secondary winding, and a feedback circuit coupled to the auxiliary winding to generate a feedback signal indicative of the output voltage. The control method comprises: determining whether the isolated switching converter works under normal operation or light load condition. If the isolated switching converter works under normal operation: controlling the primary switch based on the feedback signal; and turning on the secondary switch after the primary switch is off and turning off the secondary switch before the primary switch is on. If the isolated switching converter works under light load condition: controlling the secondary switch based on the output voltage, wherein the secondary switch is turned on to generate a negative secondary current flowing through the secondary winding and turned off when the negative secondary current reaches a secondary current threshold; turning on the primary switch based on a negative primary current; and turning off the primary switch when the primary current reaches a primary current threshold.

In the embodiments of the present invention, under light load condition, the secondary controller is used as a master controller and the primary controller is used as a slave controller, the feedback signal to provide the feedback information is no longer needed. So the primary switch can be fully turned off when the output current is zero, the no load efficiency of the isolated switching converter is enhanced. Furthermore, since the feedback control of the secondary controller is conducted directly based on the output voltage, the isolated switching converter can give a prompt response during load transient up. The undershoot of the output voltage in the prior art is eliminated.

BRIEF DESCRIPTION OF THE DRAWINGS

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

In the detailed description below, a flyback converter is used as an example to explain the working principle of the invention. However, persons of ordinary skill in the art can recognize that the invention can also be applied to other suitable isolated converters.

Figure 3:
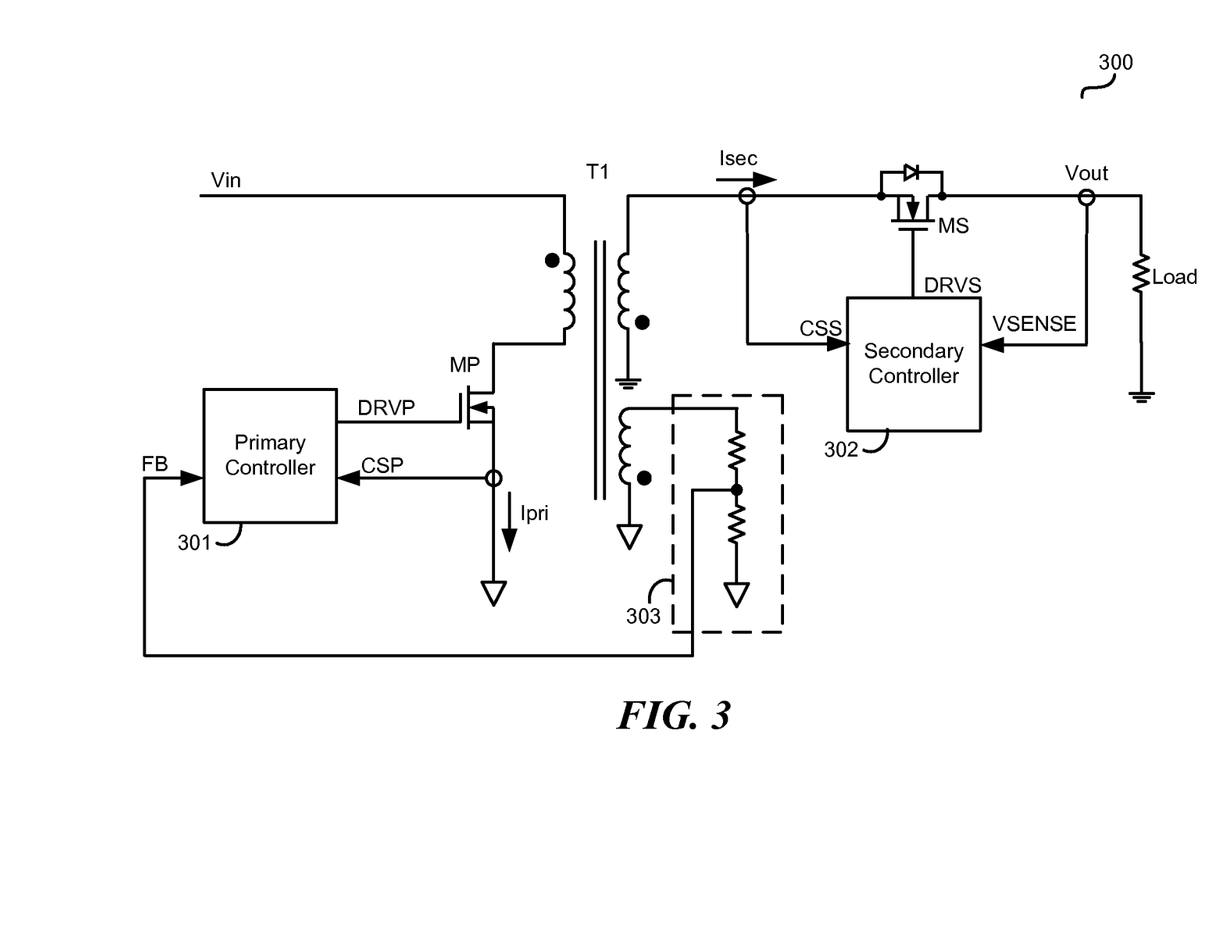
FIG. 3 is a block diagram of an isolated switching converter 300 in accordance with an embodiment of the present invention.

FIG. 3 is a block diagram of an isolated switching converter 300 in accordance with an embodiment of the present invention. The switching converter 300 comprises a transformer T1, a primary switch MP, a secondary switch MS, a primary controller 301, a secondary controller 302 and a feedback circuit 303. The transformer T1 has a primary winding, a secondary winding and an auxiliary winding, wherein the primary winding is configured to receive an input voltage Vin, the secondary winding is coupled to provide an output voltage Vout to a load. The primary switch MP is coupled to the primary winding of the transformer T1. The secondary switch MS is coupled to the secondary winding of the transformer T1. The feedback circuit 303 is coupled to the auxiliary winding to generate a feedback signal FB indicative of the output voltage Vout. In the embodiment shown in FIG. 3, the feedback circuit 303 comprises a resistor divider. The primary controller 301 is configured to generate a primary control signal DRVP to control the primary switch MP. The secondary controller 302 is configured to generate a secondary control signal DRVS to control the secondary switch MS.

Under normal operation, the primary controller 301 is used as a master controller. It generates the primary control signal DRVP to control the primary switch MP based on the feedback signal FB. The secondary controller 302 is used as a slave controller. It turns on the secondary switch MS after the primary switch MP is off and turns off the secondary switch MS before the primary switch MP is on. The secondary controller 302 may detect the status of the primary switch MP based on the drain-source voltage of the secondary switch MS, the voltage across the secondary winding or the secondary current Isec flowing through the secondary winding.

Under light load condition, the secondary controller 302 is used as a master controller and controls the secondary switch MS based on the output voltage Vout. The secondary controller 302 turns on the secondary switch MS and gets the secondary current Isec flowing through the secondary winding to be negative. The secondary controller 302 then turns off the secondary switch MS when the negative secondary current reaches a secondary current threshold, so a negative primary current flowing through the primary winding is generated based on the negative secondary current. The primary controller 301 is used as a slave controller. It turns on the primary switch MP based on the negative primary current and turns off the primary switch MP when the primary current Ipri reaches a primary current threshold.

Compared with the switching converter 100 shown in FIG. 1, under light load condition, the switching converter 300 uses the secondary controller 302 as a master controller and the primary controller 301 as a slave controller, the feedback signal FB is no longer needed to provide the feedback information. So the primary switch MP can be fully turned off under no load condition, the no load efficiency of the switching converter 300 is enhanced compared with the switching converter 100. Furthermore, since the feedback control of the secondary controller 302 is conducted directly based on the output voltage Vout, the switching converter 300 can give a prompt response during load transient up. The undershoot of the output voltage Vout in the switching converter 100 is eliminated.

In the embodiment shown in FIG. 3, the primary switch MP and the secondary switch MS are both n type MOSFETs. Persons skilled in the art can recognize, however, that the primary switch MP and the secondary switch MS may also be p type MOSFETs or any other controllable semiconductor devices. In the embodiment shown in FIG. 3, the secondary switch MS is coupled between the high end of the secondary winding and the load. In other embodiments, the secondary switch MS may be coupled between the low end of the secondary winding and the load.

Figure 4:
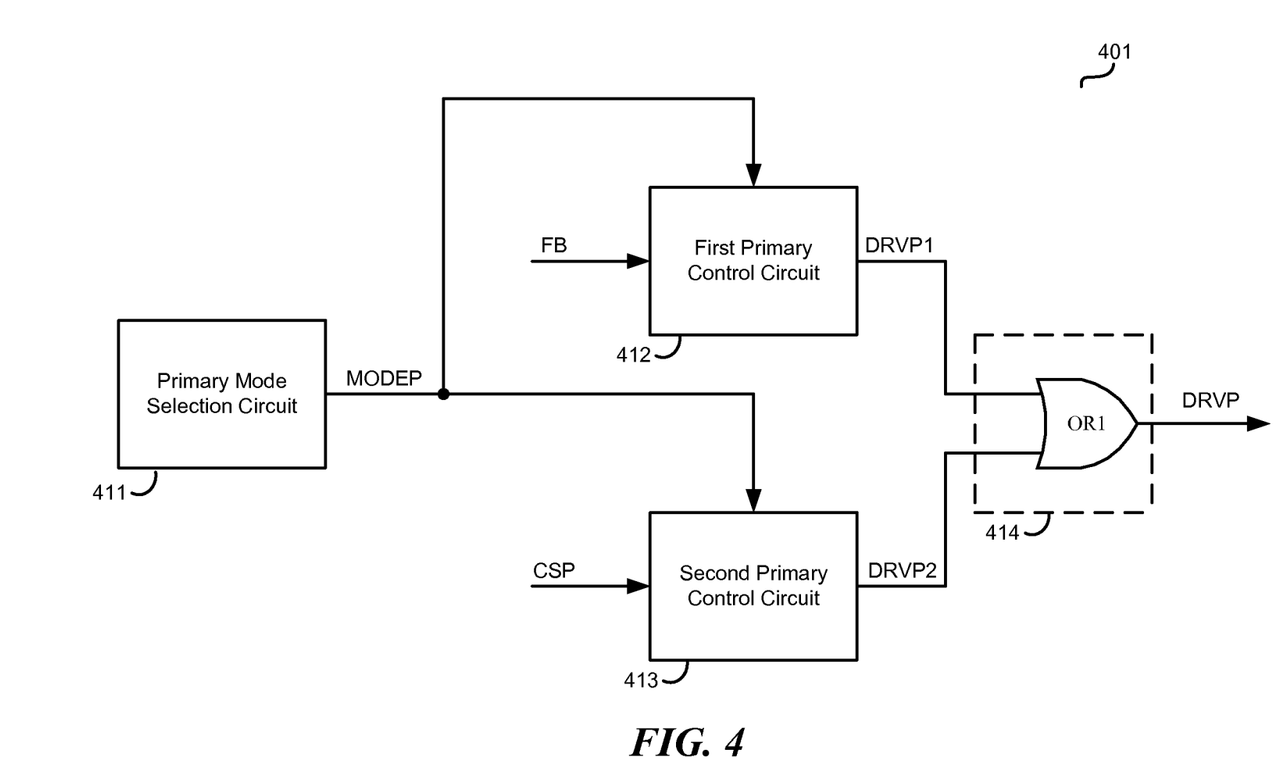
FIG. 4 is a block diagram of a primary controller 401 in accordance with an embodiment of the present invention.

FIG. 4 is a block diagram of a primary controller 401 in accordance with an embodiment of the present invention. The primary controller 401 comprises a primary mode selection circuit 411, a first primary control circuit 412, a second primary control circuit 413 and a primary logic circuit 414. The primary mode selection circuit 411 is configured to generate a primary mode selection signal MODEP. It may detect the load condition based on one or more of the switching frequency Fs of the switching converter, the primary current Ipri and the feedback signal FB, and generate the primary mode selection signal MODEP based thereon. It may also receive load condition information from the secondary controller and accordingly generate the primary mode selection signal MODEP.

The first primary control circuit 412 has a first input terminal, a second input terminal and an output terminal, wherein the first input terminal is coupled to the primary mode selection circuit 411 to receive the primary mode selection signal MODEP, the second input terminal is coupled to the feedback circuit to receive the feedback signal FB. Based on the primary mode selection signal MODEP and the feedback signal FB, the first primary control circuit 412 generates a first primary control signal DRVP1 at the output terminal.

The second primary control circuit 413 has a first input terminal, a second input terminal and an output terminal, wherein the first input terminal is coupled to the primary mode selection circuit 411 to receive the primary mode selection signal MODEP, the second input terminal is configured to receive a primary current sensing signal CSP indicative of the primary current Ipri. Based on the primary mode selection signal MODEP and the primary current sensing signal CSP, the second primary control circuit 413 generates a second primary control signal DRVP2 at the output terminal.

The primary logic circuit 414 has a first input terminal, a second input terminal and an output terminal, wherein the first input terminal is coupled to the output terminal of the first primary control circuit 412 to receive the first primary control signal DRVP1, the second input terminal is coupled to the output terminal of the second primary control circuit 413 to receive the second primary control signal DRVP2. Based on the first primary control signal DRVP1 and the second primary control signal DRVP2, the primary logic circuit 414 generates the primary control signal DRVP at the output terminal.

In an embodiment, the primary mode selection signal MODEP is used to enable or disable the first primary control circuit 412 and the second primary control circuit 413, the primary logic circuit 414 comprises an OR gate OR1. Under normal operation, the first primary control circuit 412 is enabled and the second primary control circuit 413 is disabled. The primary control signal DRVP is equal to the first primary control signal DRVP1. Under light load condition, the first primary control circuit 412 is disabled and the second primary control circuit 413 is enabled. The primary control signal DRVP is equal to the second primary control signal DRVP2.

Figure 5:
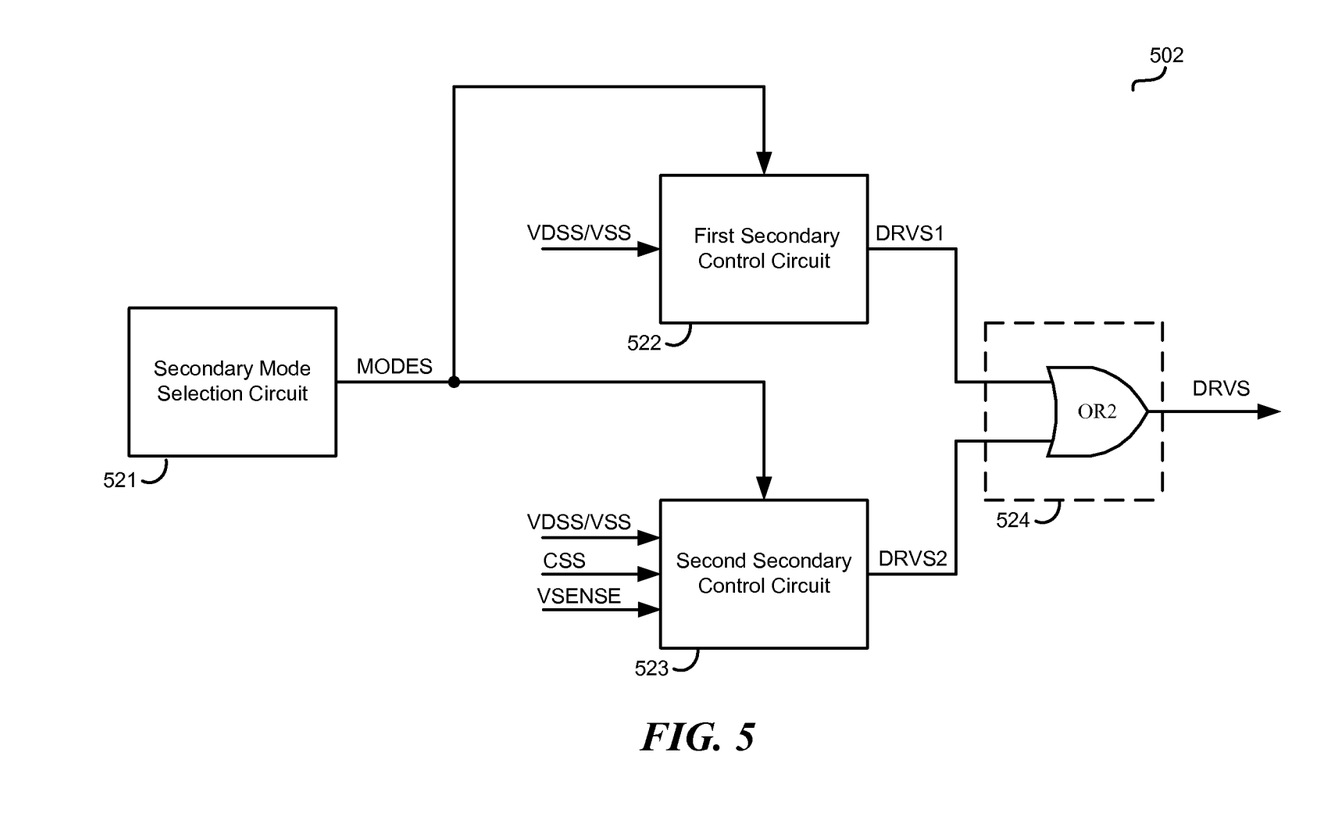
FIG. 5 is a block diagram of a secondary controller 502 in accordance with an embodiment of the present invention.

FIG. 5 is a block diagram of a secondary controller 502 in accordance with an embodiment of the present invention. The secondary controller 502 comprises a secondary mode selection circuit 521, a first secondary control circuit 522, a second secondary control circuit 523 and a secondary logic circuit 524. The secondary mode selection circuit 521 is configured to generate a secondary mode selection signal MODES. It may detect the load condition based on one or more of the switching frequency Fs, the secondary current Isec and the output voltage Vout, and generate the secondary mode selection signal MODES based thereon. It may also receive load condition information from the primary controller and accordingly generate the secondary mode selection signal MODES.

The first secondary control circuit 522 has a first input terminal, a second input terminal and an output terminal, wherein the first input terminal is coupled to the secondary mode selection circuit 521 to receive the secondary mode selection signal MODES, the second input terminal is configured to receive a terminal voltage (e.g. drain-source voltage VDSS or source voltage VSS) of the secondary switch. Based on the secondary mode selection signal MODES and the terminal voltage of the secondary switch, the first secondary control circuit 522 generates a first secondary control signal DRVS1 at the output terminal.

The second secondary control circuit 523 has a first input terminal, a second input terminal, a third input terminal, a fourth input terminal and an output terminal, wherein the first input terminal is coupled to the secondary mode selection circuit 521 to receive the secondary mode selection signal MODES, the second input terminal is configured to receive the terminal voltage of the secondary switch, the third input terminal is configured to receive a secondary current sensing signal CSS indicative of the negative secondary current, the fourth input terminal is configured to receive an output voltage sensing signal VSENSE indicative of the output voltage Vout. Based on the secondary mode selection signal MODES, the terminal voltage of the secondary switch, the secondary current sensing signal CSS and the output voltage sensing signal VSENSE, the second secondary control circuit 523 generates a second secondary control signal DRVS2 at the output terminal.

The secondary logic circuit 524 has a first input terminal, a second input terminal and an output terminal, wherein the first input terminal is coupled to the output terminal of the first secondary control circuit 522 to receive the first secondary control signal DRVS1, the second input terminal is coupled to the output terminal of the second secondary control circuit 523 to receive the second secondary control signal DRVS2. Based on the first secondary control signal DRVS1 and the second secondary control signal DRVS2, the secondary logic circuit 524 generates the secondary control signal DRVS at the output terminal.

In an embodiment, the secondary mode selection signal MODES is used to enable or disable the first secondary control circuit 522 and the second secondary control circuit 523, the secondary logic circuit 524 comprises an OR gate OR2. Under normal operation, the first secondary control circuit 522 is enabled and the second secondary control circuit 523 is disabled. The secondary control signal DRVS is equal to the first secondary control signal DRVS1. Under light load condition, the first secondary control circuit 522 is disabled and the second secondary control circuit 523 is enabled. The secondary control signal DRVS is equal to the second secondary control signal DRVS2.

Figure 6A:
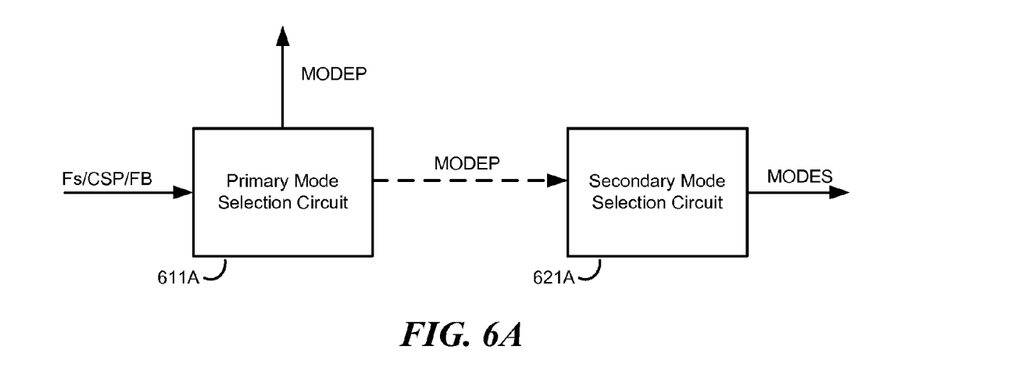
FIG. 6A~6C schematically illustrate the working principle of load condition detection and load condition information transmission in accordance with embodiments of the present invention.
Figure 6B:
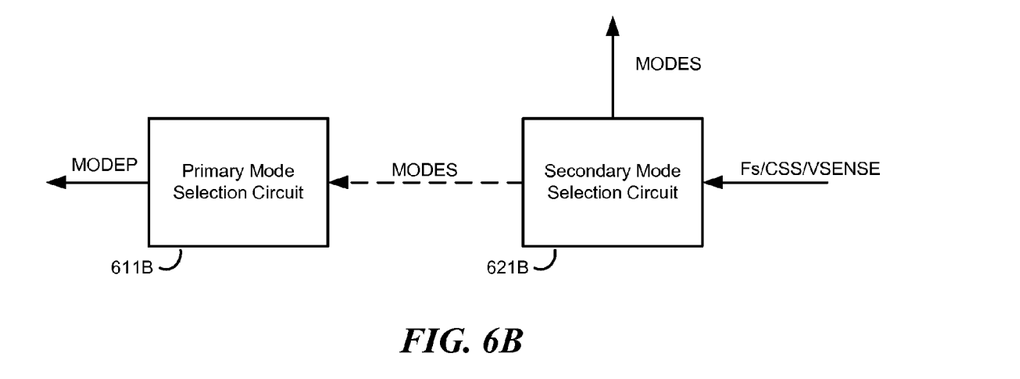
Figure 6C:
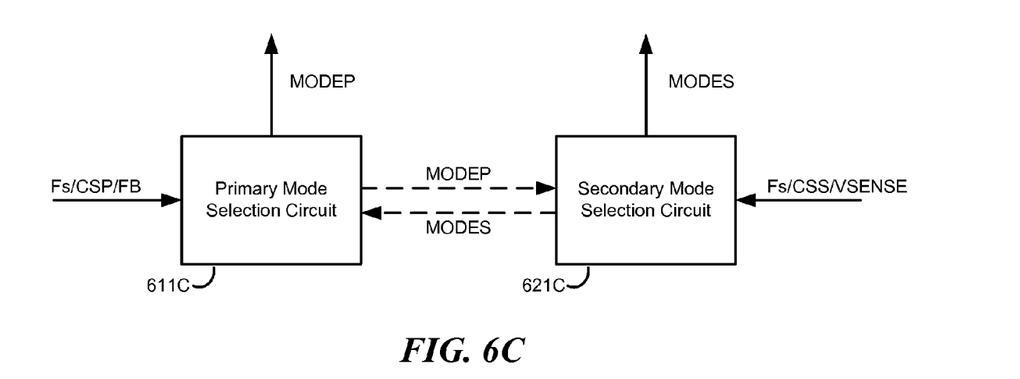

The primary controller and the secondary controller may detect the load condition or transmit load condition information based on the switching frequency Fs, the primary current Ipri, the secondary current Isec, the feedback signal FB or the output voltage Vout. FIG. 6A-6C schematically illustrate the working principle of load condition detection and load condition information transmission in accordance with embodiments of the present invention.

In the embodiment shown in FIG. 6A, the primary mode selection circuit 611A detects the load condition based on one or more of the switching frequency Fs, the primary current sensing signal CSP and the feedback signal FB to generate the primary mode selection signal MODEP. The primary mode selection signal MODEP is provided to the first and second primary control circuits. At the same time, it is further transmitted to the secondary mode selection circuit 621A. The switching frequency Fs, the primary current Ipri or the voltage across the primary winding may be modulated to carry the primary mode selection signal MODEP. And then the secondary mode selection circuit 621A may demodulate the switching frequency Fs, the secondary current Isec or the voltage across the secondary winding to receive the primary mode selection signal MODEP, and generate the secondary mode selection signal MODES based on the received primary mode selection signal MODEP. In some embodiments, the primary mode selection circuit 611A and the secondary mode selection circuit 621A may utilize other common-used signal transmission methods.

In the embodiment shown in FIG. 6B, the secondary mode selection circuit 621B detects the load condition based on one or more of the switching frequency Fs, the secondary current sensing signal CSS and the output voltage sensing signal VSENSE to generate the secondary mode selection signal MODES. The secondary mode selection signal MODES is provided to the first and second secondary control circuits. At the same time, it is further transmitted to the primary mode selection circuit 611B. The switching frequency Fs, the secondary current Isec or the voltage across the secondary winding may be modulated to carry the secondary mode selection signal MODES. And then the primary mode selection circuit 611B may demodulate the switching frequency Fs, the primary current Ipri or the voltage across the primary winding to receive the secondary mode selection signal MODES, and generate the primary mode selection signal MODEP based on the received secondary mode selection signal MODES. In some embodiments, the primary mode selection circuit 611B and the secondary mode selection circuit 621B may utilize other common-used signal transmission methods.

In the embodiment shown in FIG. 6C, under normal operation, the primary mode selection circuit 611C detects the light load condition based on one or more of the switching frequency Fs, the primary current sensing signal CSP and the feedback signal FB to generate the primary mode selection signal MODEP, and transmits the primary mode selection signal MODEP to the secondary mode selection circuit 621C. The secondary mode selection circuit 621C generates the secondary mode selection signal MODES based on the received primary mode selection signal MODEP.

Under light load condition, the secondary mode selection circuit 621C detects the normal operation based on one or more of the switching frequency Fs, the secondary current sensing signal CSS and the output voltage sensing signal VSENSE to generate the secondary mode selection signal MODES, and transmits the secondary mode selection signal MODES to the primary mode selection circuit 611C. The primary mode selection circuit 611C generates the primary mode selection signal MODEP based on the received secondary mode selection signal MODES.

The signal transmission between the primary mode selection circuit 611C and the secondary mode selection circuit 621C may be realized by modulation and demodulation of the switching frequency Fs, the primary current Ipri, the secondary current Isec and so on. It may also be realized by other common-used methods.

In one embodiment, when the switching frequency Fs is reduced to be lower than a first frequency threshold, the primary mode selection circuit 611C determines the switching converter works under light load condition. The primary controller is changed from master controller into slave controller, the first primary control circuit is disabled and the second primary control circuit is enabled. When the secondary mode selection circuit 621C detects the output voltage sensing signal VSENSE is reduced to a predetermined threshold or the primary switch MP has not been turned on for a plurality of continuous switching cycles, the primary mode selection signal MODEP is deemed as being received. The secondary controller is changed from slave controller into master controller, the first secondary control circuit is disabled and the second secondary control circuit is enabled.

When the switching frequency Fs is increased to be higher than a second frequency threshold, the secondary mode selection circuit 621C determines the switching converter works under normal operation. The secondary controller is changed from master controller into slave controller, the first secondary control circuit is enabled and the second secondary control circuit is disabled. When the primary mode selection circuit 611C detects the secondary switch MS has not been turned on for a plurality of continuous switching cycles, the secondary mode selection signal MODES is deemed as being received. The primary controller is changed from slave controller into master controller, the first primary control circuit is enabled and the second primary control circuit is disabled.

Figure 7:
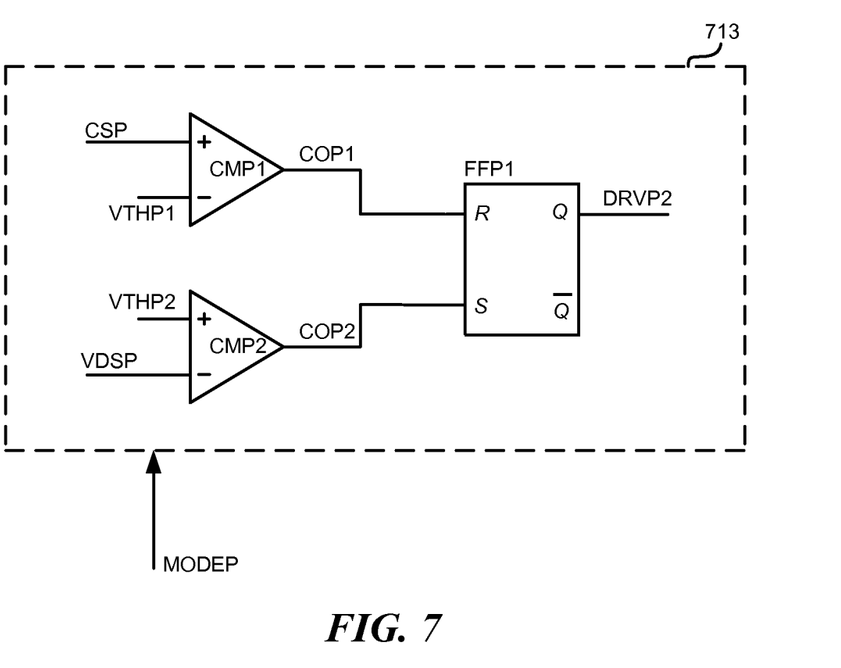
FIG. 7 schematically illustrates a second primary control circuit 713 in accordance with an embodiment of the present invention.

FIG. 7 schematically illustrates a second primary control circuit 713 in accordance with an embodiment of the present invention. The second primary control circuit 713 is enabled or disabled under the control of the primary mode selection signal MODEP. It comprises comparators CMP1, CMP2 and a flip-flop FFP1. The comparator CMP1 has a non-inverting input terminal, an inverting input terminal and an output terminal, wherein the non-inverting input terminal is configured to receive the primary current sensing signal CSP, the inverting input terminal is configured to receive a threshold VTHP1. The comparator CMP1 compares the primary current sensing signal CSP with the threshold VTHP1 and generates a comparison signal COP1 at the output terminal. The comparator CMP2 has a non-inverting input terminal, an inverting input terminal and an output terminal, wherein the non-inverting input terminal is configured to receive a threshold VTHP2, the inverting input terminal is configured to receive a drain-source voltage VDSP of the primary switch. The comparator CMP2 compares the drain-source voltage VDSP of the primary switch with the threshold VTHP2 and generates a comparison signal COP2 at the output terminal. The flip-flop FFP1 has a reset terminal, a set terminal and an output terminal, wherein the reset terminal is coupled to the output terminal of the comparator CMP1 to receive the comparison signal COP1, the set terminal is coupled to the output terminal of the comparator CMP2 to receive the comparison signal COP2. Based on the comparison signals COP1 and COP2, the flip-flop FFP1 generates the second primary control signal DRVP2 at the output terminal.

Under light load condition, the second primary control circuit 713 is enabled and the primary control signal DRVP is equal to the second primary control signal DRVP2. The secondary switch MS is turned on to generate a negative secondary current. When the secondary switch MS is turned off, this negative secondary current is magnetically coupled to generate a negative primary current through the primary winding. The snubber capacitor located between the drain terminal and source terminal of the primary switch is discharged, and the drain-source voltage VDSP of the primary switch gradually reduces. When the drain-source voltage VDSP of the primary switch reduces to reach the threshold VTHP2 (e.g. 0V), the flip-flop FFP1 is set and the primary switch MP is turned on. The primary current Ipri and the primary current sensing signal CSP gradually increase after the primary switch MP is turned on. When the primary current sensing signal CSP increases to reach the threshold VTHP1, the flip-flop FFP1 is reset and the primary switch MP is turned off. The threshold VTHP1 may be a constant value, or a value varying with the peak value of the negative primary current.

The second primary control circuit 713 shown in FIG. 7 detects the drain-source voltage VDSP of the primary switch to realize a zero voltage switching of the primary switch MP. However, persons of ordinary skill in the art can recognize that, in other embodiments, the second primary control circuit may directly turn on the primary switch once detecting a negative primary current based on the primary current sensing signal CSP.

Figure 8:
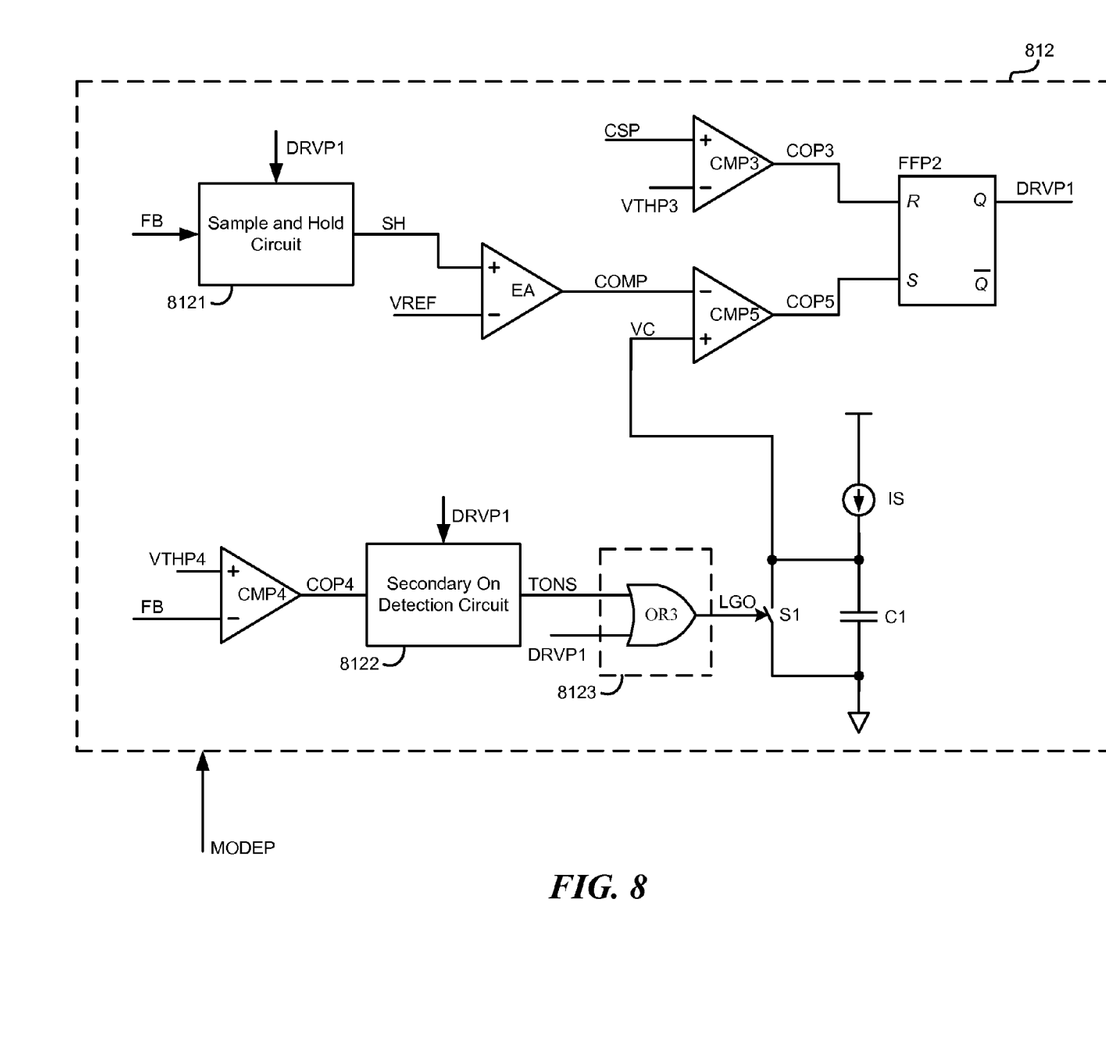
FIG. 8 schematically illustrates a first primary control circuit 812 in accordance with an embodiment of the present invention.

FIG. 8 schematically illustrates a first primary control circuit 812 in accordance with an embodiment of the present invention. The first primary control circuit 812 is enabled or disabled under the control of the primary mode selection signal MODEP. It comprises comparators CMP3, CMP4, CMP5, a sample and hold circuit 8121, a secondary on detection circuit 8122, an error amplifier EA, a logic gate circuit 8123, a current source IS, a capacitor C1, a discharge switch 51 and a flip-flop FFP2. The comparator CMP3 has a non-inverting input terminal, an inverting input terminal and an output terminal, wherein the non-inverting input terminal is configured to receive the primary current sensing signal CSP, the inverting input terminal is configured to receive a threshold VTHP3. The comparator CMP3 compares the primary current sensing signal CSP with the threshold VTHP3 and generates a comparison signal COP3 at the output terminal. The sample and hold circuit 8121 has a first input terminal, a second input terminal and an output terminal, wherein the first input terminal is coupled to the feedback circuit to receive the feedback signal FB, the second input terminal is configured to receive the first primary control signal DRVP1. The sample and hold circuit 8121 samples and holds the feedback signal FB based on the first primary control signal DRVP1 and generates a sample and hold signal SH at the output terminal. In an embodiment, the sample and hold circuit 8121 samples and holds the feedback signal FB after the primary switch MP has been turned off for a time period (e.g. 3.5 uS). The error amplifier EA has a non-inverting input terminal, an inverting input terminal and an output terminal, wherein the non-inverting input terminal is coupled to the output terminal of the sample and hold circuit 8121 to receive the sample and hold signal SH, the inverting input terminal is configured to receive a reference signal VREF. Based on the sample and hold signal SH and the reference signal VREF, the error amplifier EA generates a compensation signal COMP at the output terminal.

The comparator CMP4 has a non-inverting input terminal, an inverting input terminal and an output terminal, wherein the non-inverting input terminal is configured to receive a threshold VTHP4 (e.g. 0.1V), the inverting input terminal is coupled to the feedback circuit to receive the feedback signal FB. The comparator CMP4 compares the feedback signal FB with the threshold VTHP4 and generates a comparison signal COP4 at the output terminal. The secondary on detection circuit 8122 has a first input terminal, a second input terminal and an output terminal, wherein the first input terminal is coupled to the output terminal of the comparator CMP4 to receive the comparison signal COP4, the second input terminal is configured to receive the first primary control signal DRVP1. Based on the comparison signal COP4 and the first primary control signal DRVP1, the secondary on detection circuit 8122 generates a secondary on signal TONS at the output terminal. The logic gate circuit 8123 has a first input terminal, a second input terminal and an output terminal, wherein the first input terminal is coupled to the output terminal of the secondary on detection circuit 8122 to receive the secondary on signal TONS, the second input terminal is configured to receive the first primary control signal DRVP1. Based o the secondary on signal TONS and the first primary control signal DRVP1, the logic gate circuit 8123 generates a logic output signal LGO at the output terminal. In an embodiment, the logic gate circuit 8123 comprises an OR gate OR3.

The current source IS has an input terminal and an output terminal, wherein the input terminal is coupled to a power supply voltage. The capacitor C1 has a first terminal and a second terminal, wherein the first terminal is coupled to the output terminal of the current source IS, the second terminal is grounded. The discharge switch 51 has a first terminal, a second terminal and a control terminal, wherein the first terminal is coupled to the first terminal of the capacitor C1, the second terminal is grounded, the control terminal is coupled to the output terminal of the logic gate circuit 8123 to receive the logic output signal LGO. The comparator CMP5 has a non-inverting input terminal, an inverting input terminal and an output terminal, wherein the non-inverting input terminal is coupled to the first terminal of the capacitor C1, the second input terminal is coupled to the output terminal of the error amplifier EA to receive the compensation signal COMP. The comparator CMP5 compares the voltage across the capacitor C1 with the compensation signal COMP and generates a comparison signal COP5 at the output terminal. The flip-flop FFP2 has a reset terminal, a set terminal and an output terminal, wherein the reset terminal is coupled to the output terminal of the comparator CMP3 to receive the comparison signal COP3, the set terminal is coupled to the output terminal of the comparator CMP5 to receive the comparison signal COP5. Based on the comparison signals COP3 and COP5, the flip-flop FFP2 generates the first primary control signal DRVP1 at the output terminal.

Under normal operation, the first primary control circuit 812 is enabled and the primary control signal DRVP is equal to the first primary control signal DRVP1. When the primary switch MP is on, the transformer T1 stores energy, the primary current Ipri and the primary current sensing signal CSP gradually increase. When the primary current sensing signal CSP increases to reach the threshold VTHP3, the flip-flop FFP2 is reset and the primary switch MP is turned off. The energy stored in the transformer T1 is transmitted to the load. After the energy stored in the transformer T1 has been fully transmitted to the load, the current source IS charges the capacitor C1 and the voltage across the capacitor C1 gradually increases. When the voltage across the capacitor C1 increases to reach the compensation signal COMP, the flip-flop FFP2 is set and the primary switch MP is turned on.

The first primary control circuit 812 shown in FIG. 8 utilizes an off time control. However, persons of ordinary skill in the art can recognize that, in other embodiments, the first primary control circuit may utilize other suitable control methods, such as fix-frequency peak current control, quasi-resonant control and so on.

Figure 9:
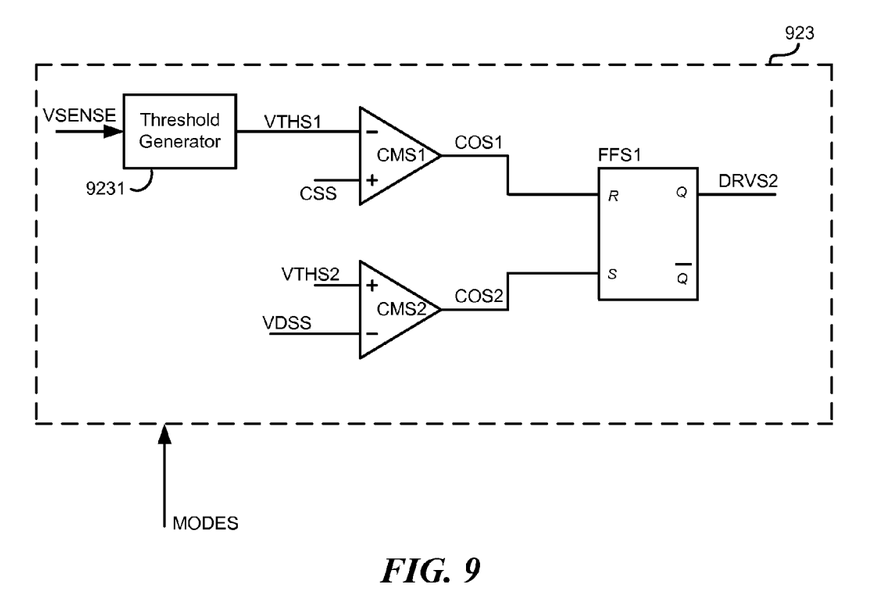
FIG. 9 schematically illustrates a second secondary control circuit 923 in accordance with an embodiment of the present invention.

FIG. 9 schematically illustrates a second secondary control circuit 923 in accordance with an embodiment of the present invention. The second secondary control circuit 923 is enabled or disabled under the control of the secondary mode selection signal MODES. It comprises a threshold generator 9231, comparators CMS1, CMS2 and a flip-flop FFS1. The threshold generator 9231 has an input terminal and an output terminal, wherein the input terminal is configured to receive the output voltage sensing signal VSENSE, and wherein based on the output voltage sensing signal VSENSE, the threshold generator 9231 generates a threshold VTHS1 at the output terminal. The comparator CMS1 has a non-inverting input terminal, an inverting input terminal and an output terminal, wherein the non-inverting input terminal is configured to receive the secondary current sensing signal CSS, the inverting input terminal is coupled to the output terminal of the threshold generator 9231 to receive the threshold VTHS1. The comparator CMS1 compares the secondary current sensing signal CSS with the threshold VTHS1 and generates a comparison signal COS1 at the output terminal. The comparator CMS2 has a non-inverting input terminal, an inverting input terminal and an output terminal, wherein the non-inverting input terminal is configured to receive a threshold VTHS2, the second input terminal is configured to receive a drain-source voltage VDSS of the secondary switch. The comparator CMS2 compares the drain-source voltage VDSS of the secondary switch with the threshold VTHS2 and generates a comparison signal COS2 at the output terminal. The flip-flop FFS1 has a reset terminal, a set terminal and an output terminal, wherein the reset terminal is coupled to the output terminal of comparator CMS1 to receive the comparison signal COS1, the set terminal is coupled to the output terminal of the comparator CMS2 to receive the comparison signal COS2. Based on the comparison signals COS1 and COS2, the flip-flop FFS1 generates the second secondary control signal DRVS2 at the output terminal.

Under light load condition, the second secondary control circuit 923 is enabled and the secondary control signal DRVS is equal to the second secondary control signal DRVS2. After the primary switch MP is turned off, the body diode of the secondary switch MS is turned on. The drain-source voltage VDSS of the secondary switch is reduced to be lower than the threshold VTHS2 (e.g. −500 mV). The flip-flop FFS1 is set, the secondary switch MS is turned on. The secondary current Isec gradually reduces and changes to be negative. When the secondary current sensing signal CSS indicative of the negative secondary current increases to reach the threshold VTHS1, the flip-flop FFS1 is reset and the secondary switch MS is turned off.

The second secondary control circuit 923 shown in FIG. 9 adjusts the threshold VTHS1 according to the output voltage sensing signal VSENSE, so the secondary current threshold and the peak value of the negative secondary current are adjusted accordingly. The primary controller may adjust the primary current threshold along with the peak value of the negative secondary current to realize the regulation of the output voltage Vout. Furthermore, persons skilled in the art can understand that the second secondary control circuit may utilize other suitable control methods, such as hysteresis control, off-time control and so on.

Figure 10:
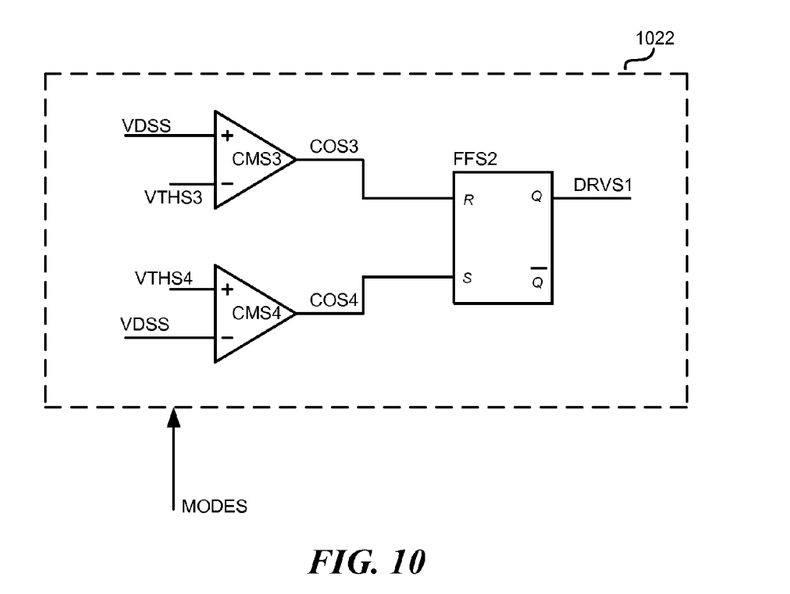
FIG. 10 schematically illustrates a first secondary control circuit 1022 in accordance with an embodiment of the present invention.

FIG. 10 schematically illustrates a first secondary control circuit 1022 in accordance with an embodiment of the present invention. The first secondary control circuit 1022 is enabled or disabled under the control of the secondary mode selection signal MODES. It comprises comparators CMS3, CMS4 and a flip-flop FFS2. The comparator CMS3 has a non-inverting input terminal, an inverting input terminal and an output terminal, wherein the non-inverting input terminal is configured to receive the drain-source voltage VDSS of the secondary switch, the second input terminal is configured to receive a threshold VTHS3. The comparator CMS3 compares the drain-source voltage VDSS of the secondary switch with the threshold VTHS3 and generates a comparison signal COS3 at the output terminal. The comparator CMS4 has a non-inverting input terminal, an inverting input terminal and an output terminal, wherein the non-inverting input terminal is configured to receive a threshold VTHS4, the inverting input terminal is configured to receive the drain-source voltage VDSS of the secondary switch. The comparator CMS4 compares the drain-source voltage VDSS of the secondary switch with the threshold VTHS4 and generates a comparison signal COS4 at the output terminal. The flip-flop FFS2 has a reset terminal, a set terminal and an output terminal, wherein the reset terminal is coupled to the output terminal of the comparator CMS3 to receive the comparison signal COS3, the second input terminal is coupled to the output terminal of the comparator CMS4 to receive the comparison signal COS4. Based on the comparison signals COS3 and COS4, the flip-flop FFS2 generates the first secondary control signal DRVS1 at the output terminal.

Under normal operation, the first secondary control circuit 1022 is enabled and the secondary control signal DRVS is equal to the first secondary control signal DRVS1. After the primary switch MP is turned off, the body diode of the secondary switch MS is turned on. The drain-source voltage VDSS of the secondary switch is reduced to be lower than the threshold VTHS4 (e.g. −500 mV). The flip-flop FFS2 is set and the secondary switch MS is turned on. When the primary switch MP is going to be on, the drain-source voltage VDSS of the secondary switch gradually increases. When the drain-source voltage VDSS increases to reach the threshold VTHS3 (e.g. −70 mV), the flip-flop FFS2 is reset and the secondary switch MS is turned off.

The first secondary control circuit 1022 shown in FIG. 10 controls the secondary switch MS based on its drain-source voltage VDSS. Persons of ordinary skill in the art can recognize, however, that the first secondary control circuit may also detect the status of the primary switch MP based on the voltage across the secondary winding or the secondary current Isec, and turn on or turn off the secondary switch MS accordingly.

Figure 11:
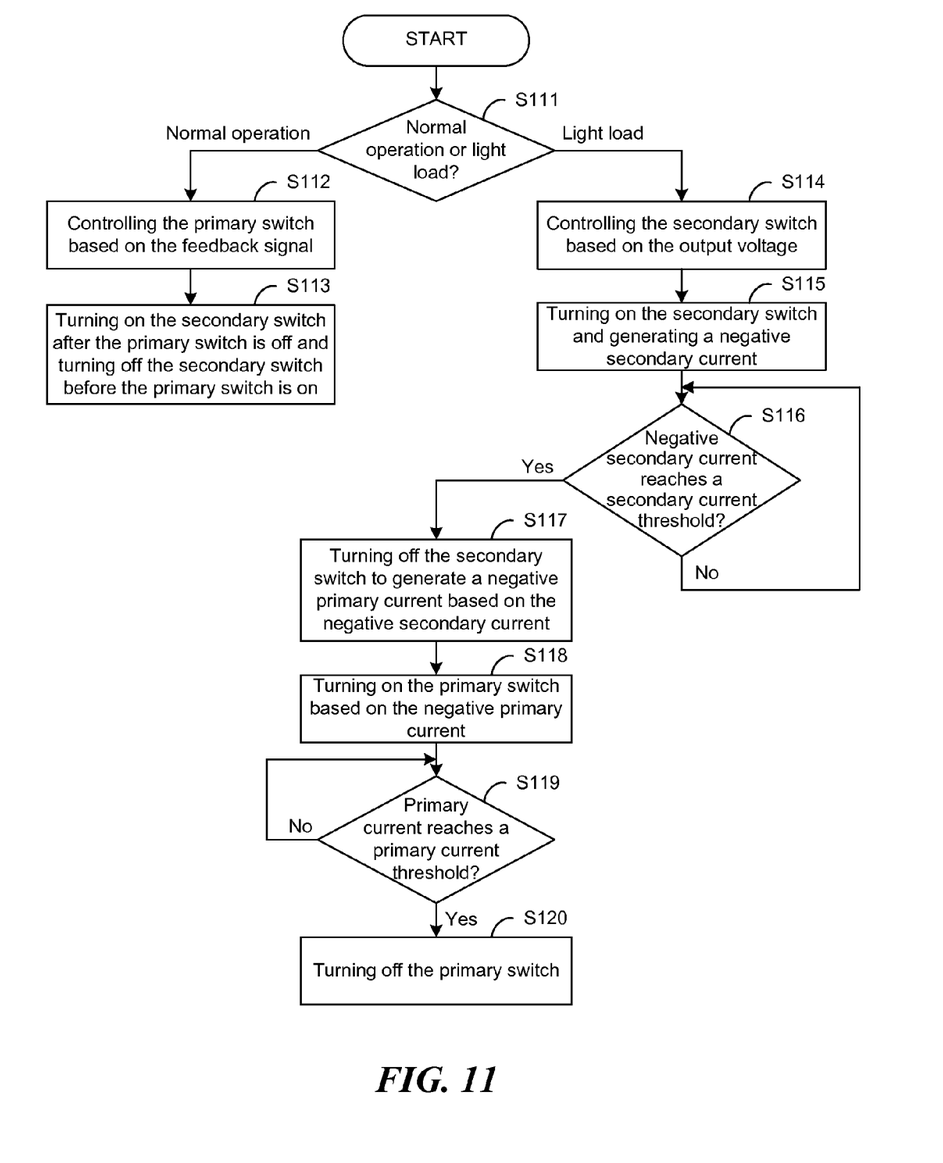
FIG. 11 is a working flowchart of a control method used in an isolated switching converter in accordance with an embodiment of the present invention.

FIG. 11 is a working flowchart of a control method used in an isolated switching converter in accordance with an embodiment of the present invention. The control method comprises steps S111~S120.

At step S111, whether the isolated switching converter works under normal operation or light load condition is detected. If the switching converter works under normal operation, proceed to step S112. Else if the switching converter works under light load condition, proceed to step S114.

At step S112, the primary switch is controlled based on the feedback signal. Then at step S113, the secondary switch is controlled based on the status of the primary switch. It is turned on after the primary switch is off and turned off before the primary switch is on.

At step S114, the secondary switch is controlled based on the output voltage. At step S115, the secondary switch is turned on and a negative secondary current flowing through the secondary winding is generated. At step S116, whether the negative secondary current reaches a secondary current threshold is detected. If the negative secondary current reaches the secondary current threshold, proceed to step S117, else, keep detecting.

At step S117, the secondary switch is turned off, and a negative primary current flowing through the primary winding is generated. At step S118, the primary switch is turned on based on the negative primary current. At step S119, whether the primary current reaches a primary current threshold is detected. If the primary current reaches the primary current threshold, proceed to step S120, else, keep detecting.

At step S120, the primary switch is turned off.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

We claim:
1. An isolated switching converter, comprising:
a transformer having a primary winding, a secondary winding and an auxiliary winding, wherein the primary winding is configured to receive an input voltage, the secondary winding is coupled to provide an output voltage to a load;
a primary switch coupled to the primary winding;
a secondary switch coupled to the secondary winding;
a feedback circuit coupled to the auxiliary winding, wherein the feedback circuit is configured to generate a feedback signal indicative of the output voltage;
a primary controller configured to generate a primary control signal to control the primary switch; and
a secondary controller configured to generate a secondary control signal to control the secondary switch; wherein
under normal operation, the primary controller controls the primary switch based on the feedback signal, the secondary controller controls the secondary switch based on the status of the primary switch wherein the secondary switch is turned on after the primary switch is off, and the secondary switch is turned off before the primary switch is on; and wherein
under light load condition, the secondary controller controls the secondary switch based on the output voltage wherein the secondary switch is turned on to generate a negative secondary current flowing through the secondary winding and turned off when the negative secondary current reaches a secondary current threshold, the primary controller turns on the primary switch based on a negative primary current and turns off the primary switch when the primary current reaches a primary current threshold.

2. The isolated switching converter of claim 1, wherein the primary controller comprises:
a primary mode selection circuit configured to generate a primary mode selection signal;
a first primary control circuit having a first input terminal, a second input terminal and an output terminal, wherein the first input terminal is coupled to the primary mode selection circuit to receive the primary mode selection signal, the second input terminal is coupled to the feedback circuit to receive the feedback signal, and wherein based on the primary mode selection signal and the feedback signal, the first primary control circuit generates a first primary control signal at the output terminal;
a second primary control circuit having a first input terminal, a second input terminal and an output terminal, wherein the first input terminal is coupled to the primary mode selection circuit to receive the primary mode selection signal, the second input terminal is configured to receive a primary current sensing signal indicative of the primary current, and wherein based on the primary mode selection signal and the primary current sensing signal, the second primary control circuit generates a second primary control signal at the output terminal; and
a primary logic circuit having a first input terminal, a second input terminal and an output terminal, wherein the first input terminal is coupled to the output terminal of the first primary control circuit to receive the first primary control signal, the second input terminal is coupled to the output terminal of the second primary control circuit to receive the second primary control signal, and wherein based on the first primary control signal and the second primary control signal, the primary logic circuit generates the primary control signal at the output terminal.

3. The isolated switching converter of claim 2, wherein the primary mode selection circuit detects the load condition based on one or more of switching frequency of the isolated switching converter, the primary current and the feedback signal, and generates the primary mode selection signal based on the load condition.

4. The isolated switching converter of claim 2, wherein the second primary control circuit comprises:
a first primary comparator having a first input terminal, a second input terminal and an output terminal, wherein the first input terminal is configured to receive the primary current sensing signal, the second input terminal is configured to receive a first primary threshold, and wherein the first primary comparator compares the primary current sensing signal with the first primary threshold and generates a first primary comparison signal at the output terminal;
a second primary comparator having a first input terminal, a second input terminal and an output terminal, wherein the first input terminal is configured to receive a second primary threshold, the second input terminal is configured to receive a drain-source voltage of the primary switch, and wherein the second primary comparator compares the drain-source voltage of the primary switch with the second primary threshold and generates a second primary comparison signal at the output terminal;
a first primary flip-flop having a first input terminal, a second input terminal and an output terminal, wherein the first input terminal is coupled to the output terminal of the first primary comparator to receive the first primary comparison signal, the second input terminal is coupled to the output terminal of the second primary comparator to receive the second primary comparison signal, and wherein based on the first primary comparison signal and the second primary comparison signal, the first primary flip-flop generates the second primary control signal at the output terminal.

5. The isolated switching converter of claim 2, wherein the first primary control circuit comprises:
a third primary comparator having a first input terminal, a second input terminal and an output terminal, wherein the first input terminal is configured to receive the primary current sensing signal, the second input terminal is configured to receive a third primary threshold, and wherein the third primary comparator compares the primary current sensing signal with the third primary threshold and generates a third primary comparison signal at the output terminal;
a sample and hold circuit having a first input terminal, a second input terminal and an output terminal, wherein the first input terminal is coupled to the feedback circuit to receive the feedback signal, the second input terminal is configured to receive the first primary control signal, and wherein the sample and hold circuit samples and holds the feedback signal based on the first primary control signal and generates a sample and hold signal at the output terminal;
an error amplifier having a first input terminal, a second input terminal and an output terminal, wherein the first input terminal is coupled to the output terminal of the sample and hold circuit to receive the sample and hold signal, the second input terminal is configured to receive a reference signal, and wherein based on the sample and hold signal and the reference signal, the error amplifier generates a compensation signal at the output terminal;

a fourth primary comparator having a first input terminal, a second input terminal and an output terminal, wherein the first input terminal is configured to receive a fourth primary threshold, the second input terminal is coupled to the feedback circuit to receive the feedback signal, and wherein the fourth primary comparator compares the feedback signal with the fourth primary threshold and generates a fourth primary comparison signal at the output terminal;

a secondary on detection circuit having a first input terminal, a second input terminal and an output terminal, wherein the first input terminal is coupled to the output terminal of the fourth primary comparator to receive the fourth primary comparison signal, the second input terminal is configured to receive the first primary control signal, and wherein based on the fourth primary comparison signal and the first primary control signal, the secondary on detection circuit generates a secondary on signal at the output terminal;

a logic gate circuit having a first input terminal, a second input terminal and an output terminal, wherein the first input terminal is coupled to the output terminal of the secondary on detection circuit to receive the secondary on signal, the second input terminal is configured to receive the first primary control signal, and wherein based o the secondary on signal and the first primary control signal, the logic gate circuit generates a logic output signal at the output terminal;

a current source having an input terminal and an output terminal, wherein the input terminal is coupled to a power supply voltage;

a capacitor having a first terminal and a second terminal, wherein the first terminal is coupled to the output terminal of the current source, the second terminal is grounded;

a discharge switch having a first terminal, a second terminal and a control terminal, wherein the first terminal is coupled to the first terminal of the capacitor, the second terminal is grounded, the control terminal is coupled to the output terminal of the logic gate circuit to receive the logic output signal;

a fifth primary comparator having a first input terminal, a second input terminal and an output terminal, wherein the first input terminal is coupled to the first terminal of the capacitor, the second input terminal is coupled to the output terminal of the error amplifier to receive the compensation signal, and wherein the fifth primary comparator compares the voltage across the capacitor with the compensation signal and generates a fifth primary comparison signal at the output terminal; and a second primary flip-flop having a first input terminal, a second input terminal and an output terminal, wherein the first input terminal is coupled to the output terminal of the third primary comparator to receive the third primary comparison signal, the second input terminal is coupled to the output terminal of the fifth primary comparator to receive the fifth primary comparison signal, and wherein based on the third primary comparison signal and the fifth primary comparison signal, the second primary flip-flop generates the first primary control signal at the output terminal.

6. The isolated switching converter of claim 1, wherein the secondary controller comprises:

a secondary mode selection circuit configured to generate a secondary mode selection signal;

a first secondary control circuit having a first input terminal, a second input terminal and an output terminal, wherein the first input terminal is coupled to the secondary mode selection circuit to receive the secondary mode selection signal, the second input terminal is configured to receive a terminal voltage of the secondary switch, and wherein based on the secondary mode selection signal and the terminal voltage of the secondary switch, the first secondary control circuit generates a first secondary control signal at the output terminal;

a second secondary control circuit having a first input terminal, a second input terminal, a third input terminal, a fourth input terminal and an output terminal, wherein the first input terminal is coupled to the secondary mode selection circuit to receive the secondary mode selection signal, the second input terminal is configured to receive the terminal voltage of the secondary switch, the third input terminal is configured to receive a secondary current sensing signal indicative of the negative secondary current, the fourth input terminal is configured to receive an output voltage sensing signal indicative of the output voltage, and wherein based on the secondary mode selection signal, the terminal voltage of the secondary switch, the secondary current sensing signal and the output voltage sensing signal, the second secondary control circuit generates a second secondary control signal at the output terminal; and a secondary logic circuit having a first input terminal, a second input terminal and an output terminal, wherein the first input terminal is coupled to the output terminal of the first secondary control circuit to receive the first secondary control signal, the second input terminal is coupled to the output terminal of the second secondary control circuit to receive the second secondary control signal, and wherein based on the first secondary control signal and the second secondary control signal, the secondary logic circuit generates the secondary control signal at the output terminal.

7. The isolated switching converter of claim 6, wherein the secondary mode selection circuit detects the load condition based on one or more of switching frequency of the isolated switching converter, the secondary current and the output voltage, and generates the secondary mode selection signal based on the load condition.

8. The isolated switching converter of claim 6, wherein the second secondary control circuit comprises:

a threshold generator having an input terminal and an output terminal, wherein the input terminal is configured to receive the output voltage sensing signal, and wherein based on the output voltage sensing signal, the threshold generator generates a first secondary threshold at the output terminal;

a first secondary comparator having a first input terminal, a second input terminal and an output terminal, wherein the first input terminal is configured to receive the secondary current sensing signal, the second input terminal is coupled to the output terminal of the threshold generator to receive the first secondary threshold, and wherein the first secondary comparator compares the secondary current sensing signal with the first secondary threshold and generates a first secondary comparison signal at the output terminal;

a second secondary comparator having a first input terminal, a second input terminal and an output terminal, wherein the first input terminal is configured to receive a second secondary threshold, the second input terminal is configured to receive a drain-source voltage of the secondary switch, and wherein the second secondary comparator compares the drain-source voltage of the secondary switch with the second secondary threshold and generates a second secondary comparison signal at the output terminal;

a first secondary flip-flop having a first input terminal, a second input terminal and an output terminal, wherein the first input terminal is coupled to the output terminal of the first secondary comparator to receive the first secondary comparison signal, the second input terminal is coupled to the output terminal of the second secondary comparator to receive the second secondary comparison signal, and wherein based on the first secondary comparison signal and the second secondary comparison signal, the first secondary flip-flop generates the second secondary control signal at the output terminal.

9. The isolated switching converter of claim 6, wherein the first secondary control circuit comprises:

a third secondary comparator having a first input terminal, a second input terminal and an output terminal, wherein the first input terminal is configured to receive a drain-source voltage of the secondary switch, the second input terminal is configured to receive a third secondary threshold, and wherein the third secondary comparator compares the drain-source voltage of the secondary switch with the third secondary threshold and generates a third secondary comparison signal at the output terminal;

a fourth secondary comparator having a first input terminal, a second input terminal and an output terminal, wherein the first input terminal is configured to receive a fourth secondary threshold, the second input terminal is configured to receive the drain-source voltage of the secondary switch, and wherein the fourth secondary comparator compares the drain-source voltage of the secondary switch with the fourth secondary threshold and generates a fourth secondary comparison signal at the output terminal; and a second secondary flip-flop having a first input terminal, a second input terminal and an output terminal, wherein the first input terminal is coupled to the output terminal of the third secondary comparator to receive the third secondary comparison signal, the second input terminal is coupled to the output terminal of the fourth secondary comparator to receive the fourth secondary comparison signal, and wherein based on the third secondary comparison signal and the fourth secondary comparison signal, the second secondary flip-flop generates the first secondary control signal at the output terminal.

10. A control method used in an isolated switching converter, wherein the isolated switching converter is configured to convert an input voltage into an output voltage to drive a load, and wherein the isolated switching converter comprises a transformer having a primary winding, a secondary winding and an auxiliary winding, a primary switch coupled to the primary winding, a secondary switch coupled to the secondary winding, and a feedback circuit coupled to the auxiliary winding to generate a feedback signal indicative of the output voltage, the control method comprises:

determining whether the isolated switching converter works under normal operation or light load condition;

if the isolated switching converter works under normal operation:

controlling the primary switch based on the feedback signal; and controlling the secondary switch based on the status of the primary switch, wherein the secondary switch is turned on after the primary switch is off and turned off before the primary switch is on;

if the isolated switching converter works under light load condition:

controlling the secondary switch based on the output voltage, wherein the secondary switch is turned on to generate a negative secondary current flowing through the secondary winding and turned off when the negative secondary current reaches a secondary current threshold;

turning on the primary switch based on a negative primary current; and turning off the primary switch when the primary current reaches a primary current threshold.

11. The control method of claim 10, wherein the load condition is detected based on at least one of switching frequency of the isolated switching converter, the primary current, the secondary current, the feedback signal and the output voltage.

12. The control method of claim 10, wherein the step of turning off the primary switch under light load condition comprises:

comparing a primary current sensing signal indicative of the primary current with a first primary threshold and turning off the primary switch when the primary current sensing signal is larger than the first primary threshold.

13. The control method of claim 10, wherein the step of turning on the primary switch under light load condition comprises:

comparing a drain-source voltage of the primary switch with a second primary threshold and turning on the primary switch when the drain-source voltage of the primary switch is smaller than the second primary threshold.

14. The control method of claim 10, wherein the step of controlling the secondary switch under light load condition comprises:

generating a first secondary threshold based on an output voltage sensing signal indicative of the output voltage;

comparing a secondary current sensing signal indicative of the negative secondary current with the first secondary threshold and turning off the secondary switch when the secondary current sensing signal is larger than the first secondary threshold; and comparing a drain-source voltage of the secondary switch with a second secondary threshold and turning on the secondary switch when the drain-source voltage of the secondary switch is smaller than the second secondary threshold.

15. The control method of claim 10, wherein the step of controlling the secondary switch under normal operation comprises:

comparing a drain-source voltage of the secondary switch with a third secondary threshold and turning off the secondary switch when the drain-source voltage of the secondary switch is larger than the third secondary threshold; and comparing the drain-source voltage of the secondary switch with a fourth secondary threshold and turning on the secondary switch when the drain-source voltage of the secondary switch is smaller than the fourth secondary threshold.

* * * * *